W. D. HAZENHYER.
CORN HARVESTER.
APPLICATION FILED MAY 3, 1916. RENEWED JULY 17, 1918.
1,278,644.
Patented Sept. 10, 1918.
2 SHEETS—SHEET 1.
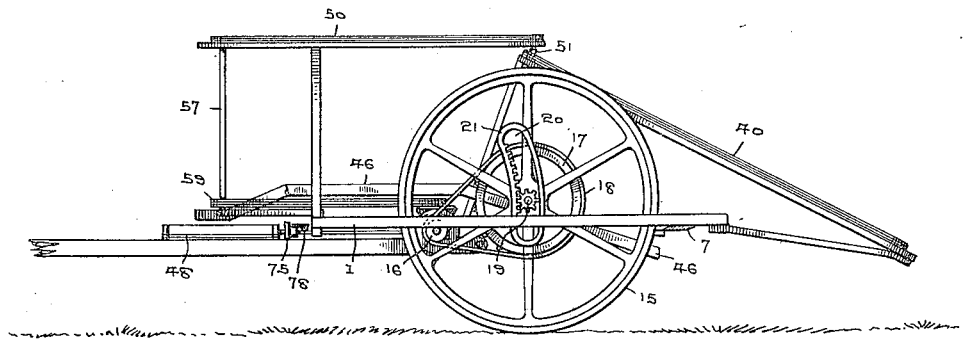
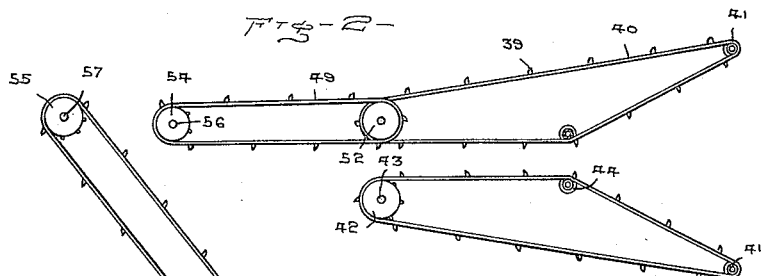
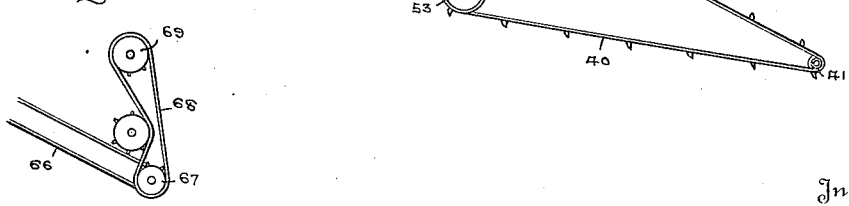

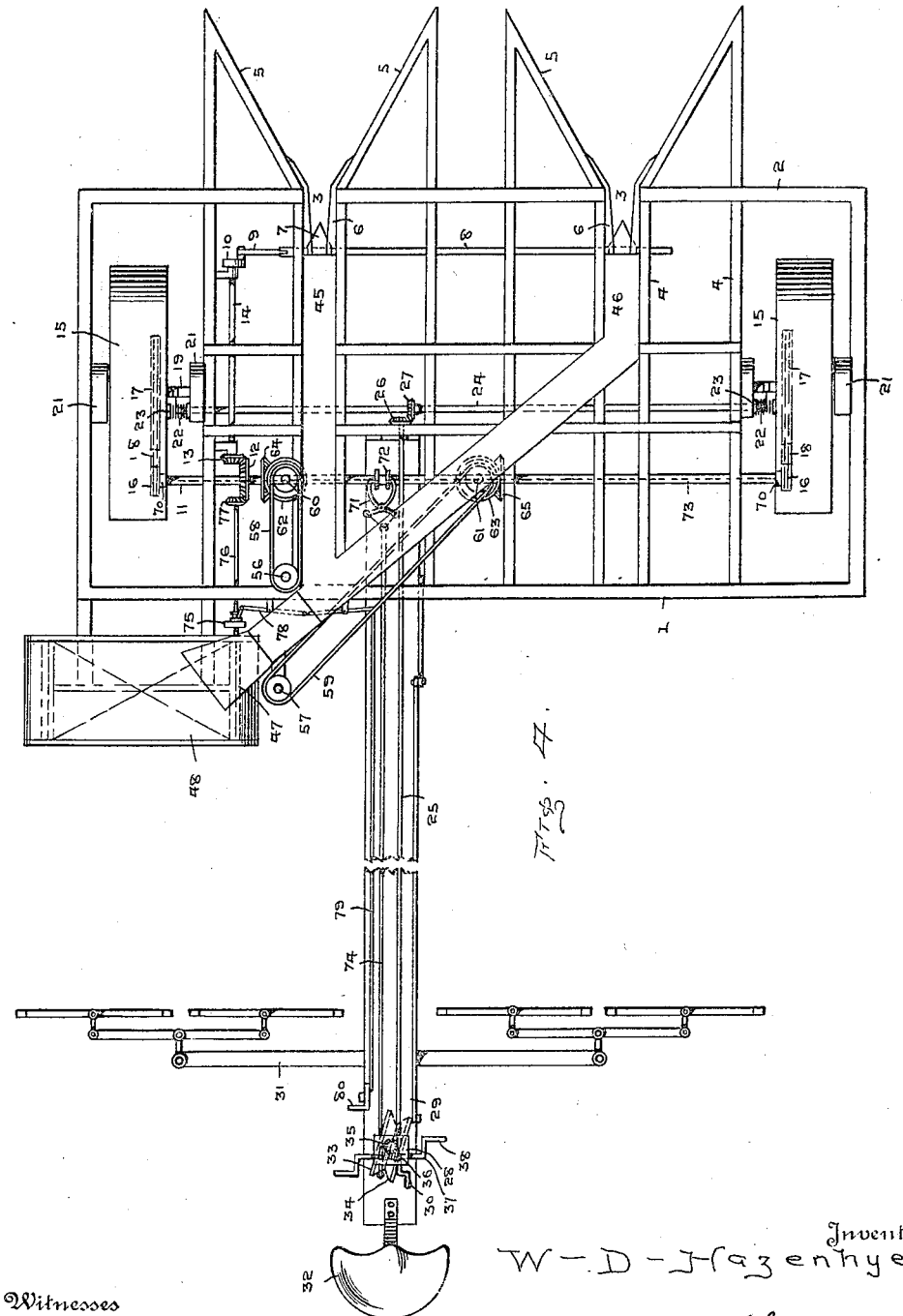

UNITED STATES PATENT OFFICE.

WILLIAM D. HAZENHYER, OF WELLINGTON, KANSAS, ASSIGNOR OF FORTY-NINE ONE-HUNDREDTHS TO JAMES W. CALTA, OF PLATTE, SOUTH DAKOTA.

CORN-HARVESTER.

1,278,644.   Specification of Letters Patent.   Patented Sept. 10, 1918.

Application filed May 3, 1916, Serial No. 95,128. Renewed July 17, 1918. Serial No. 245,404.

*To all whom it may concern:*

Be it known that I, WILLIAM D. HAZEN-HYER, a citizen of the United States, residing at Wellington, in the county of Sumner and State of Kansas, have invented certain new and useful Improvements in Corn-Harvesters; and I do hereby declare the following to be a full, clear, and exact description of the invention, such as will enable others skilled in the art to which it appertains to make and use the same.

My invention relates to new and useful improvements in corn harvesters and my object is to provide an improved device of this class which will cut two rows of corn at one time.

Other objects and advantages will be hereinafter set forth and more particularly pointed out in the accompanying specification.

In the accompanying drawings which are made a part of this application,

Figure 1 is an end elevation of the machine showing parts thereof broken away.

Fig. 2 is a diagrammatic top plan view of the chains employed for transporting the stalks from the cutters to a common point at the rear of the machine.

Fig. 3 is a detail plan view of means for driving certain of said chains, and

Fig. 4 is a top plan view of the machine with parts thereof removed and portions broken away.

Referring to the drawings in which similar reference numerals designate corresponding parts throughout the several views, 1 indicates a frame, the side and end bars of which are preferably formed of hollow sections, the front bar 2 of the frame being formed in sections, which sections are spaced apart to form passages 3, the passages being so positioned that the stalks of growing corn will register with and enter said passages.

Extending transversely of the frame 1 are a plurality of cross bars 4 which bars are constructed similar to the bars of the frame 1 and are connected to the front and rear bars of the frame, said cross bars being arranged in pairs on opposite sides of the passages 3 and project forwardly of the front bar 2, the ends of the cross bars adjacent the passages being extended at an angle outwardly and attached to the projecting ends of the other cross bars, thus providing guards or fingers 5 for guiding the stalks of corn of the two rows into their respective passages.

The cross bars 4 and the angular faces of the guards 5, adjacent the passages 3, are provided with knives 6, the cutting edges of the knives extending at an angle to the faces of the parts to which they are secured so that a stalk of corn coming in contact with the knives will be partially severed while entering the passages. Adapted to reciprocate transversely of the passages 3 are cutting blades 7 carried by a bar 8, said bar being attached at one end to a pitman 9 which pitman is in turn attached to the usual form of crank wheel 10, the cutting blades 7, in their movement, coöperating with the inner ends of the knives 6 for readily severing the stalks of corn.

The crank wheel 10 is operated by a driving shaft 11 through the medium of gears 12 and 13 and a shaft 14, the driving shaft 11 being operated from the driving wheels 15 through the medium of sprockets 16 and 17 and sprocket chains 18 coöperating therewith. The frame 1 is adjusted with respect to the wheels 15 by extending the ends of the axles 19 of the wheels 15 into slots 20 of brackets 21, said brackets being attached to the bars of the frame 1 and connected to said axles are cables 22 which cables are adapted to be wound upon or unwound from drums 23 carried by an operating shaft 24, and it will be readily seen that as the cables are wound upon the drum, the frame 1 will be raised and when unwound therefrom the frame will be lowered.

The shaft 24 is operated by hand to raise and lower the frame by providing an operating rod 25, the forward end of which has attached thereto a gear 26 which meshes with a gear 27 on the shaft 24, said operating rod being extended rearwardly of the frame 1 and through a standard 28 at the rear end of a tongue structure 29, the rear end of the rod having a crank portion 30 which is to be grasped by the driver and the rod 25 rotated to wind or unwind the cables.

The tongue structure 29 is attached to the frame 1 in any suitable manner, preferably by hinging the same and is extended rearwardly a sufficient distance to accommodate the draft animal in the rear of the harvester, any preferred form of equalizer or draft appliance 31 being attached to the tongue structure 29 immediately forward of the seat 32 at the end of the tongue.

A guide wheel 33 is positioned below the rear end of the tongue 29, the periphery of which is preferably provided with a substantially V-shape groove 34 so that it will readily grip the surface of the soil over which it is passing. The guide wheel is attached to a vertical shaft, to the upper end of which is secured a gear 35 which meshes with a worm 36, said worm being mounted upon a shaft 37 carried by the standard 28, the ends of the shaft being formed into crank pedals 38 so that the driver can control the action of the guide wheel by operating the worm and gear by pressure of the feet upon the pedals.

The stalks of corn are caused to travel rearwardly after being severed by the cutting blades and knives, by means of fingers 39 carried by endless chains 40, there being a chain on each side of each cutting blade, said chains passing around sprockets 41 adjacent the pointed ends of the guards 5 and also around sprockets 42 carried by vertically extending shafts 43 and as said chains 40 are inclined downwardly the shafts 43 are likewise set at an inclination or at right angles to the trend of the chains, and in order to cause the chains to travel along the tapered edges of the guards 5 and then parallel with the cross bars adjacent the passages, idlers 44 are positioned on the front bar of the frame on opposite sides of the passages 3.

In order to carry the severed stalks to the rear of the machine and discharge the stalks at a common point, guide ways 45 and 46 are extended rearwardly from the cutting blades 7, the guide way 45 extending in a straight line to the rear edge of the frame 1, while the rear portion of the guide way 46 is directed at an angle so that it will intersect the guide way 45 at a point adjacent the rear edge of the frame 1 thereby discharging the stalks from both of the guide ways at a common point.

The stalks, after leaving the guide ways 45 and 46, enter a binding construction, but as said binding construction forms no part of my invention, it is not deemed necessary to describe the same. After the stalks have been bound into bundles, the bundles are discharged onto a tilting platform 47 from whence they descend upon an endless carrier 48 and are deposited at one side of the path of the harvester and the draft animals attached thereto.

As the endless chains 40 terminate before reaching the rear edge of the frame 1, additional endless chains 49 and 50 are provided, the chain 49 coöperating with the guide way 45 while the chain 50 coöperates with the angular portion of the guide way 46 and as the shafts 43 are disposed at an angle to the trend of the chains 49 and 50, said shafts are provided with universal joints 51 above the sprockets 42 so that that portion of the shafts 43, above said sprockets, will remain in a vertical position or at right angles to the trend of the chains 49 and 50, said vertical portions of the shafts having sprockets 52 and 53 around which the chains 49 and 50 travel, the rear ends of said chains extending around sprockets 54 and 55 respectively, carried by shafts 56 and 57.

The shafts 56 and 57 are rotated by extending belts 58 and 59 around said shafts and around the vertically extending shafts 60 and 61, said shafts having gears 62 and 63 attached thereto which mesh with similar gears 64 and 65 on the driving shaft 11, while the pairs of endless chains 40 are driven from the shafts 60 and 61 by means of belts 66, sprockets 67, sprocket chains 68 and sprockets 69 attached to the lower ends of the shafts 43, the sprocket chains 68 being so arranged with respect to the sprockets 67 and 69 that the pairs of endless chains will be caused to travel in the same direction, as shown in Fig. 3 of the drawing.

In order to prevent the guide ways 45 and 46 from coming in contact with any of the gears, said guide ways are elevated between their ends so as to pass over said gears and driving chains, as best shown in Fig. 1 of the drawing.

The driving shaft 11 may be disconnected from the driving wheels 15 by providing a suitable clutch mechanism 70 adjacent the sprockets 16 which clutches are drawn out of engagement with said sprockets by means of a lever mechanism 71 coöperating with disks 72 on the driving shaft 11, said disks being connected to the clutches 70 by means of cables 73, the lever mechanism being operated by the driver, by extending a rod 74 from the lever mechanism to a point adjacent the seat 32.

The carrier 48 is intermittently operated by arranging a clutch 75 on the driving shaft 76, said shaft being operated from the gear 12 by means of a pinion 77, the clutch being operated by levers 78 connected to an operating rod 79, the outer end of the rod being attached to a foot lever 80 in convenient reach of the driver.

In operation, as the machine is moved forwardly, the stalks of corn, whether standing straight or leaning to one side of the rows, will be gathered by the guards 5 and endless chains connected therewith and brought into the path of the cutting blades and knives where the stalk is severed and then carried by the chains and guide ways to the rear of the frame and discharged at a common point, and after the stalks have been bound into a bundle, the bundle is moved onto a platform 47 which platform automatically trips and discharges the bundle on to the carrier 48. The foot lever 80 is then operated to apply rotating power to the carrier which will move the bundle laterally of the machine and discharge the same at a point beyond the path of the draft animals, and if desired, the carrier can be made of sufficient length to contain a number of the bundles.

Having thus fully described my invention what I claim as new and desire to secure by Letters Patent of the United States, is:—

In a double row corn harvester a main frame having at its front end oppositely inclined guiding fingers and rearwardly extended passages therefrom, knives at the entrances to said passages, cutting blades and means for reciprocating them transversely of said passages for coöperation with said knives, guide ways extended rearwardly from said cutting blades one in a straight line and the other having its rear portion directed at an angle to intersect the first-named guide way, a driven shaft carried by the frame and operatively geared to the supporting wheels, gathering and conveying means for moving the stalks through the guide ways and means for operating said gathering and conveyer means from said driven shaft, the said guide ways being elevated between the ends to pass over the driving mechanism, and a carrier intermittently operated from the driving shaft.

In testimony whereof I have signed my name to this specification.

WILLIAM D. HAZENHYER.

Copies of this patent may be obtained for five cents each, by addressing the "Commissioner of Patents, Washington, D. C."